(12) United States Patent
Tayyib et al.

(10) Patent No.: US 11,718,785 B2
(45) Date of Patent: Aug. 8, 2023

(54) ENHANCING FOAM STABILITY USING ALLIUM SATIVUM OIL

(71) Applicant: SAUDI ARABIAN OIL COMPANY, Dhahran (SA)

(72) Inventors: Deena Tayyib, Dhahran (SA); Zuhair AlYousif, Saihat (SA); Abdulaziz AlQasim, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/651,358

(22) Filed: Feb. 16, 2022

(65) Prior Publication Data
US 2022/0169918 A1    Jun. 2, 2022

Related U.S. Application Data

(62) Division of application No. 16/874,825, filed on May 15, 2020, now abandoned.

(51) Int. Cl.
| | |
|---|---|
| C09K 8/94 | (2006.01) |
| E21B 43/16 | (2006.01) |
| C09K 8/60 | (2006.01) |
| C09K 8/82 | (2006.01) |

(52) U.S. Cl.
CPC ............ *C09K 8/94* (2013.01); *C09K 8/602* (2013.01); *C09K 8/82* (2013.01)

(58) Field of Classification Search
CPC ... C09K 8/82; C09K 8/92; C09K 8/94; C09K 8/602; E21B 43/16; E21B 43/164; E21B 43/166
See application file for complete search history.

(56) References Cited

U.S. PATENT DOCUMENTS

| | | | | |
|---|---|---|---|---|
| 4,752,465 A | * | 6/1988 | Mackles | A61K 9/0056 424/45 |
| 6,136,778 A | * | 10/2000 | Kamiya | C11D 3/50 510/501 |
| 2003/0118515 A1 | * | 6/2003 | Jew | A61K 8/19 424/47 |

(Continued)

FOREIGN PATENT DOCUMENTS

CN    103014718 A  *  4/2013

OTHER PUBLICATIONS

Translation of CN 103014718A from google patents (Year: 2013).*

*Primary Examiner* — Angela M DiTrani Lett
(74) *Attorney, Agent, or Firm* — Osha Bergman Watanabe & Burton LLP

(57) ABSTRACT

Foaming fluid composition and methods for enhanced oil recovery are provided with enhanced foaming properties. The foaming composition may include a surfactant and *Allium sativum* oil where *Allium sativum* oil may be included in an amount ranging from 20 to 75 vol % in respect to the total volume of the surfactant and the *Allium sativum* oil. Methods of enhancing recovery of oil from an oil containing formation are also provided. Methods may include injecting a foaming composition into the oil containing formation, where the foaming composition may include a surfactant and *Allium sativum* oil. Methods may also include the foaming composition that includes *Allium sativum* oil in an amount ranging from 20 to 75 vol % in respect to the total volume of the surfactant and the *Allium sativum* oil.

18 Claims, 4 Drawing Sheets

(56) References Cited

U.S. PATENT DOCUMENTS

| | | | |
|---|---|---|---|
| 2010/0140368 A1* | 6/2010 | de Lame | A01N 25/16 424/769 |
| 2011/0017457 A1* | 1/2011 | Samuel | C09K 8/035 166/305.1 |
| 2018/0272396 A1* | 9/2018 | Farmer | C07K 14/32 |
| 2019/0218452 A1* | 7/2019 | Eluru | C09K 8/74 |

* cited by examiner

ENHANCING FOAM STABILITY USING ALLIUM SATIVUM OIL

BACKGROUND

In order to produce hydrocarbon fluids from subterranean formations, a borehole is drilled from a surface into the formation. After the borehole is successfully drilled, the borehole may then be cased, resulting in a defined wellbore. In order for the hydrocarbon fluids to flow from the surrounding formations into the wellbore and up to the surface, it is necessary to perforate the casing. In hydrocarbon production systems, Enhanced Oil Recovery (EOR) typically improves the amount of oil recovered from a producing well by using additional techniques that may help stimulate or enhance oil recovering from oil bearing formations.

EOR may be accomplished by several different techniques which may include a flooding agent that is pumped into the oil-bearing formation to move the petroleum to exit wells. Water is most often used as the flooding agent, yet intimate contact between petroleum and water creates cross-contamination that mandates remediation of large volumes of organic-contaminated water.

One of the more prominent EOR techniques applied in oil fields is injection of hydrocarbon and/or non-hydrocarbon gases, such as carbon dioxide ($CO_2$) and nitrogen ($N_2$). The main advantage of gas injection is that it can produce most of the oil in the zones swept by gas if the gas is miscible with the oil. $CO_2$ has been extensively employed to recover oil from underground formations, as it is inexpensive, non-flammable, and relatively non-toxic and remediation is not required. Carbon dioxide would be a more sustainable flooding agent than water, but the viscosity of $CO_2$ is too low to efficiently recover petroleum from the formation. Rather than sweep the oil before it, carbon dioxide "fingers" its way through the petroleum and hence leaves most of the oil behind.

Thus, despite the reported achievements of gas injection for EOR, one major challenge that still needs to be overcome to make this technique more efficient is the associated poor volumetric sweep efficiency. The key factors that contribute to this challenge are the low density and viscosity of injected gas relative to reservoir fluids, as well as the reservoir heterogeneity such as high permeability streaks and heavily fractured zones. The mobility contrast between injected gas and the other fluids in reservoirs may result in early breakthrough of gas and, hence, bypassing most of the residual/trapped oil and increasing the gas to oil ratio (GOR) which makes the overall process largely inefficient. Surfactant enhanced oil recovery includes surfactant flooding and surfactant stimulation. The main functions of surfactants are to reduce interfacial tension and wettability alteration.

Researchers in the petroleum engineering field have tried for decades to design additives that can raise the viscosity of carbon dioxide (at low concentration) to levels that would render $CO_2$-flooding more practical, but success has been elusive. Additives have been synthesized that enhanced the viscosity of simple hydrocarbons, yet which were not soluble in $CO_2$ without the use of impractically high fractions of co-solvent. Other additives have been identified that were $CO_2$-soluble but ultimately did not produce any changes in the viscosity of $CO_2$.

Improvement in the efficiency of $CO_2$-flooding may promote the use of $CO_2$ over water in EOR and thus reduce the volume of liquid waste produced during petroleum extraction. Use of $CO_2$ in EOR also results in its sequestration in rock formations, potentially an important part of an overall $CO_2$ sequestration strategy. Thus, what is at first glance, simply a technical problem in petroleum engineering, has significant environmental ramifications as well.

The use of foam is one technique to solve gas mobility challenges in petroleum reservoirs and subsequently improve the volumetric sweep efficiency. Foam can reduce the gas mobility in petroleum reservoirs by increasing the gas apparent viscosity and reducing the gas relative permeability.

Surfactants are commonly used to generate foams. However, the long-term stability of foam generated by surfactants is challenging and difficult. Factors such as harsh reservoir conditions, high temperatures, salinity, rock-fluid and fluid-fluid interactions, impact foam stability negatively and diminish the generation of strong foams.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a foaming composition for enhanced oil recovery. The foaming composition may include a surfactant and *Allium sativum* oil. The foaming composition may include *Allium sativum* oil in an amount ranging from 20 to 75 vol % in respect to the total volume of the surfactant and the *Allium sativum* oil.

In a further aspect, embodiments disclosed herein relate to a method of enhancing recovery of oil from an oil containing formation. Methods may include injecting a foaming composition into the oil containing formation, where the foaming composition may include a surfactant and *Allium sativum* oil. Methods may also include the foaming composition that includes *Allium sativum* oil in an amount ranging from 20 to 75 vol % in respect to the total volume of the surfactant and the *Allium sativum* oil.

Other aspects and advantages of the claimed subject matter will be apparent from the following description and the appended claims.

DETAILED DESCRIPTION

Figure 1A:
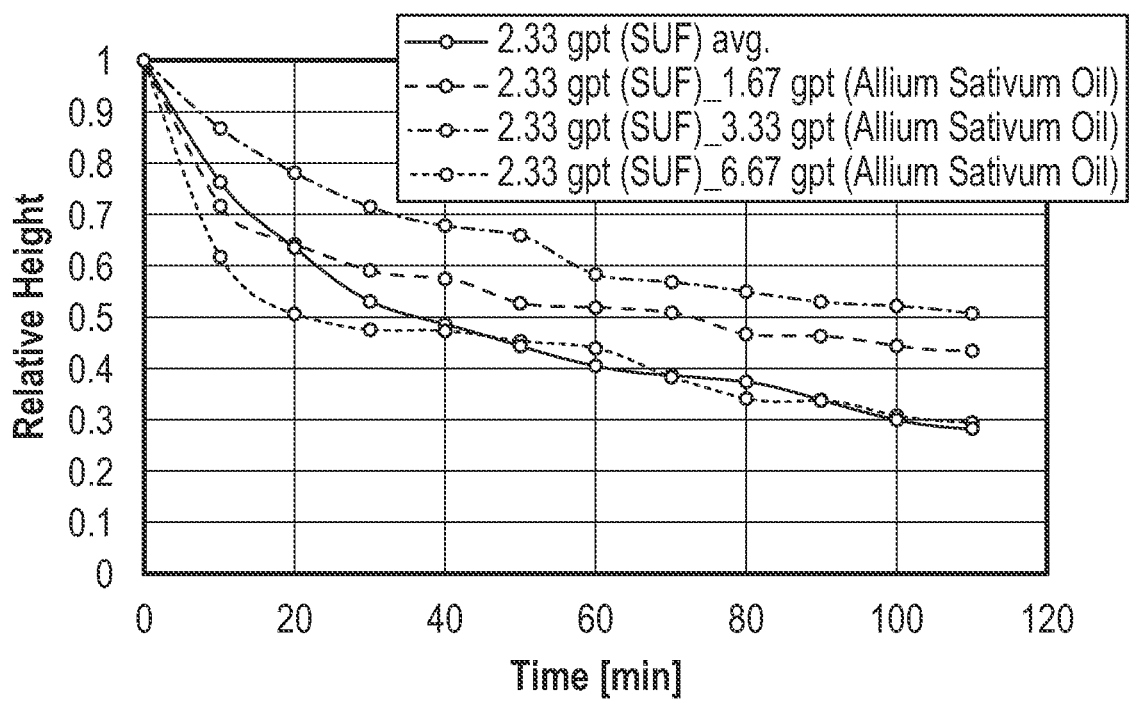
FIGS. 1A-1B are graphs of foam's relative heights for Samples 1-4 (FIG. 1A) and Samples 5-8 (FIG. 5B).

Embodiments in accordance with the present disclosure generally relate to compositions and methods for enhanced oil recovery. Such compositions and methods may provide an important role in enhancing foam stability of solutions. One or more embodiments relate to compositions and methods that increase the viscosity of fluids comprising inert gases. Such compositions and methods may include an aqueous base fluid, a surfactant, and as disclosed herein, a foam stability enhancing additive.

As noted, the use of foam is one of the most promising techniques to solve gas mobility challenges in petroleum reservoirs and subsequently improve the volumetric sweep efficiency. Foam can reduce the gas mobility in petroleum reservoirs by increasing the gas apparent viscosity and reducing the gas relative permeability. As discussed above, surfactants are commonly used to generate foams. However, the long-term stability of foam generated by surfactants is limited, and solutions have proven challenging and difficult. Factors such as harsh reservoir conditions, high temperatures, salinity, rock-fluid and fluid-fluid interactions, impact foam stability negatively and diminish the generation of strong foams.

One or more embodiments of the present disclosure relate to a foamed composition comprising a stability-enhancing additive and a surfactant for enhanced oil recovery. The additive of one or more embodiments of the present application may include one or more vegetable oils. The vegetable oil may be *Allium sativum* oil, added to a surfactant solution to increase the half-life and enhance the stability of generated foams comprising such components.

One or more embodiments of this disclosure may relate to a composition including a surface-active agent that may be mixed with a stability enhancing additive, such as *Allium sativum* oil, to generate a more stable foam than that of a foam generated using the surfactant alone. The addition of *Allium sativum* oil to the surfactant solution has been found to approximately triple the foams' half-life and maintain a small bubble sizes over a longer period of time. However, beyond a certain concentration of *Allium sativum* oil, the stability of foam may be affected negatively. In addition, the concentration of the surfactant, relative to the entire composition and to the concentration of the additive, plays a significant role in the stability of the new composition, as demonstrated herein.

One or more embodiments of the present application may relate to a composition comprising a surfactant and an additive to enhance the stability of a foamed composition. The composition may be an aqueous composition. For example, the foaming composition may be prepared in deionized water comprising a surfactant and a stability-enhancing additive to enhance the stability of the foamed composition.

In one or more embodiments, the surfactant and foam stabilizing additive may be mixed with water which can be effectively included within the present invention (in both forming and diluting the surfactant and additive concentration) and may include water from any natural source, deionized water, and water including a brine ranging in concentration of dissolved solids up to about 10 to 20% by weight depending on the reservoir temperature.

The foam stability-enhancing additive of the one or more embodiments of the present disclosure may be a vegetable, plant or nut-based oil including oils such as essential oils. In some embodiments, foam stability enhancing additive may contain active biologically occurring molecules. Specifically, a non-limiting example of vegetable oil includes *Allium sativum* (garlic) oil.

In one or more embodiments, the vegetable oil may be *Allium sativum*. In one or more embodiments, *Allium sativum* may be added to a foaming composition including water and a surfactant to result in a more stable foam with a half-life that is at least double that of the foam composition prepared without the *Allium sativum* additive. In certain embodiments, the *Allium sativum* oil additive may effectively triple the half-life of the produced foam, in comparison to the foam prepared with only a surfactant. The *Allium sativum* oil additive may also maintain the small bubble sizes of the produced foam over a longer period of time.

Other embodiments disclosed herein may relate to a composition that includes a surfactant and *Allium sativum* oil. The composition may include *Allium sativum* oil in an amount ranging from 20 to 75 vol %, relative to the total volume of surfactant and *Allium sativum*. In other embodiments, the composition may include *Allium sativum* oil in an amount ranging from 35 to 65 vol %, relative to the total volume of surfactant and *Allium sativum*.

Generally, adding oil to a foam system often destroys the foam and expedites the collapse rate of foam. However, in one or more embodiments of the present application, *Allium sativum* oil may be added to a surfactant to provide stable liquid films. In one or more embodiments, the thin film separating gas bubbles (lamellae) can be stabilized by the addition of *Allium sativum* oil. In such case, the film becomes more viscous, which can correspond to a slowing of film drainage rate. The *Allium sativum* oil may also increase the maximum capillary pressure of coalescence, resulting in an increase in the time it takes for the foam to collapse.

In one or more embodiments, the foaming composition may include an *Allium sativum* oil stability enhancing additive in an amount in the range from 0.10, 0.15, 0.20, 0.25, 0.30, 0.32, 0.34 or 0.36 vol % to 0.30, 0.32, 0.34, 0.36, 0.38, 0.40, 0.45 or 0.60 vol % in respect to the composition as a whole, where any lower limit may be combined with any mathematically feasible upper limit.

In one or more embodiments, the foaming composition may include *Allium sativum* oil in an amount in the range from 5, 10, 15, 20, 25, 30, 35, 40, 45 or 50 to 45, 50, 55, 60, 65, 70, or 75 vol % in respect to the total volume of the surfactant and the *Allium sativum* oil, where any lower limit may be combined with any mathematically feasible upper limit.

Generally, stable surfactants increase foam stability. Surfactants are compounds that may be amphiphilic, meaning they contain both hydrophobic groups (their "tails") and hydrophilic groups (their "heads"). They are commonly soluble in both organic solvents and water. Surfactants reduce the surface tension of water by adsorbing at the liquid-gas interface. They also reduce the interfacial tension between oil and water by adsorbing at the liquid-liquid interface.

In one or embodiments of the present disclosure, the surfactant of the foaming composition may be one or more surfactants selected from the group including: anionic, cationic, nonionic, zwitterionic, and amphoteric surfactants. In one or more embodiments of the present application, the surfactant may be an anionic surfactant such as an alpha-olefin sulfonate, alkyldiphenyloxide sulfonates and petroleum sulfonates. The specific surfactant may be selected based upon the specific type and characteristics of the oil-bearing formation. For example, sandstone is known to have negative charge; therefore, anionic surfactants may be selected as they are not appreciably adsorbed in the surrounding formation. Surfactants with high adsorption may decrease foam stability. In one or more embodiments, the surfactant may be a mixture of one or more of the surfactants listed above.

Depending upon the structure of the surfactant or mixture of surfactants selected, the surfactant may function as an emulsifier, dispersant, oil-wetter, water-wetter, foamer, or some combination to reduce interfacial tension and capillary forces of the oil within the voids. Surfactants may be costly such that the surfactant may be added to the composition in the smallest proportion that is found to be effective. Suitable surfactants are also preferably not diluted to any significant extent by water, since the water tends to settle out of the oil recovery composition. For example, the surfactant may come as a gel or similar highly viscous liquid.

In one or more embodiments, the foaming composition may include a surfactant in an amount ranging from 0.10, 0.15, 0.20, 0.25, 0.30, 0.32, 0.34 or 0.36 vol % to 0.30, 0.32, 0.34, 0.36, 0.38, 0.40, 0.45 or 0.60 vol % in respect to the composition as a whole, where any lower limit may be combined with any mathematically feasible upper limit.

In one or more embodiments, the foaming composition may include a surfactant in an amount ranging from 25, 30, 35, 40, 45, 50 or 55 to 45, 50, 55, 60, 65, 70, 75, 80, 85, 90 or 95 vol % in respect to the total volume of the surfactant and the *Allium sativum* oil, where any lower limit may be combined with any mathematically feasible upper limit.

In one or more embodiments, the foaming composition may include *Allium sativum* and the surfactant in amount ranging from 0.10, 0.15, 0.20, 0.25, 0.30, 0.35, 0.40, 0.45, or 0.50 vol % to 0.35, 0.40, 0.45, 0.50, 0.55, 0.60, 0.65, 0.80, 0.90, or 1.0 vol % in respect to the total volume of the entire composition, where any lower limit may be combined with any mathematically feasible upper limit.

In one or more embodiments, the foaming composition may be characterized by having a half-life ranging from 85, 90, 95, 100, 105, or 110 min. to 95, 100, 105, 110, 115 or 120 min. in respect to the amount of time for approximately 50% of the formed foam bubbles to dissipate, where any lower limit may be combined with any mathematically feasible upper limit.

In one or more embodiments, the foaming composition may be characterized by having an average bubble size that ranges from 0.2, 0.4, 0.6, 0.8, or 1 millimeter (mm) to 0.4, 0.6, 0.8, 1, or 1.2 mm, where any lower limit may be combined with any mathematically feasible upper limit.

In one or more embodiments, the foaming composition may also include at least one additional component that is selected from among corrosion inhibitors, co-surfactants, scale inhibitors, and/or mixtures thereof. The one or more additional component may optionally be included in an amount that would not diminish the effect of the foaming properties of the composition.

Generally, the type of gas used in forming the foaming composition can significantly affect the foam stability. The stability of the foam is dependent on a variety of characteristics directly associated with the gas, including, pressure, temperature, solubility of the gas in liquid, type of surfactant, salinity, acidity of the solution, and acidity of the gas. In one or more embodiments, the gas used to form the foam may be $CO_2$, $N_2$, methane, mixtures of methane with any of ethane, propane, or butane, flue gas and/or mixtures thereof. In one or more embodiments of the present disclosure, nitrogen foam may result in much stronger and more stable foams.

Enhanced Oil Recovery

The composition according to one or embodiments disclosed herein may be advantageously employed in techniques of EOR. The foamed composition may have enhanced stability relative to common EOR injected foamed compositions that may lack stability and are more easily destabilized by harsh reservoir conditions such as high temperatures, salinity, rock-fluid and fluid-fluid interactions, which have been shown to impact foam stability negatively and diminish the generation of strong foams.

In using the foam-forming composition for enhanced recovery of petroleum products, the foam may either be pre-formed or formed in situ, such as through the introduction of alternate slugs of gas and foam-forming composition into the formation. In either method, any of the presently known procedures in the art for injecting a foam into a formation may be suitable for use herein. In one or more embodiments, a pre-formed foam may at least be periodically and controllably injected into the formation. In one or more embodiments, the foam may be pre-formed in the wellbore or formed on the surface before the foam reaches the formation. A source of gas may be supplied across a range of pressures including low pressure and up to relatively high pressure (which is below the fracturing pressure of the reservoir formation) to an injection well. In one or more embodiments, the source of gas may be supplied at a pressure that is in the range from 200 psi up to about 5000 psi, dependent upon the reservoir pressure and the specific application of the foam-forming composition. In practice, this may be a central well flowing radially outward to a group of producing wells surrounding the injection well. Alternatively, the injection well may be one of several in a line capable of creating a front for a line drive of oil through the formation to one or a line of producing wells. In various embodiments, the foams according to embodiments herein may be used, for example, for cleaning shallow aquifers where the pressure is relatively low, or for formation fracturing where the pressure might exceed 5000 psi.

To account for distortion of the injection profile, foam-forming components may be added to the injected gas stream through an injection line. For example, surfactant diluted with water or brine, and including the foam stabilizing additive, may be supplied by tanks and through valves by a pump to a foam generator and then to the formation. Foams may also be supplied to the formation by forming the foam in a generator with gas before injection into wellhead. For this purpose, a portion of the injection gas flows to the foam generator to achieve the desired foam quality.

The foam may also be formed in an injection line prior to having contact with formation fluids, as by flow of the foaming composition and gas through perforations in the lower end of the injection line running down the wellbore within the wellbore casing. Any foam generated upon injection into the formation reservoir may preferentially flow to gas-permeable channels within the formation. Accordingly, the foamed composition serves to block these channels so that the gas is then diverted to oil-rich portions of the formation. In one or more embodiments, oil may then be produced from an adjacent producing well.

In one or more embodiments, the foaming composition prepared in accordance with the present disclosure may be supplied as a concentrated liquid that is then diluted with an aqueous fluid, such as deionized water or a brine. The solution may then be pumped from storage tanks by pumps at a desired rate to contact gas flowing in a wellhead or injection string.

In one or more embodiments of the present disclosure, the method according to embodiments herein has some important advantages over the traditional surfactants. For example, with the addition of *Allium sativum* as detailed in one or more embodiments of the present application, the non-ionic surfactants are effective at levels as low as 0.2 vol % in the liquid phase. In addition, the foam generated and formed from the compositions according to embodiments herein has good stability, i.e., both thermal and hydrolytic stability, as may also be relatively insensitive to oil, brine, and low pH environments.

EXAMPLES

The following examples are merely illustrative and should not be interpreted as limiting the scope of the present disclosure.

To demonstrate the advantages of the composition according to one or more embodiments disclosed herein, the following experiments were conducted to examine the stability of the composition.

Two sets of experiments including samples 1-8, were conducted under normal pressure and temperature conditions (i.e., 1 atm, 25° C.). The concentrations of the surfactant were 2.33 gallon per thousand (gpt) (sample 1-4) and 4.67 gpt (samples 5-8) in the first and second set respectively. The specific surfactant used in both experiments was STIM-IOR, an anionic alpha-olefin sulfonate surfactant. Each set involved testing three different concentrations of *Allium sativum* oil: 1.67 gpt, 3.33 gpt, and 6.67 gpt. For each test, two different types of solutions were prepared: one containing only surface-active agent in the deionized water (Samples 1 and 5) and the other containing both surface-active agent and *Allium sativum* oil (Samples 2-4 and 6-8). The procedure involved preparing the solutions in small tubes, shaking them well to ensure the generation of foams then measuring the height and bubble sizes every 10 minutes for roughly two hours.

Figure 1B:
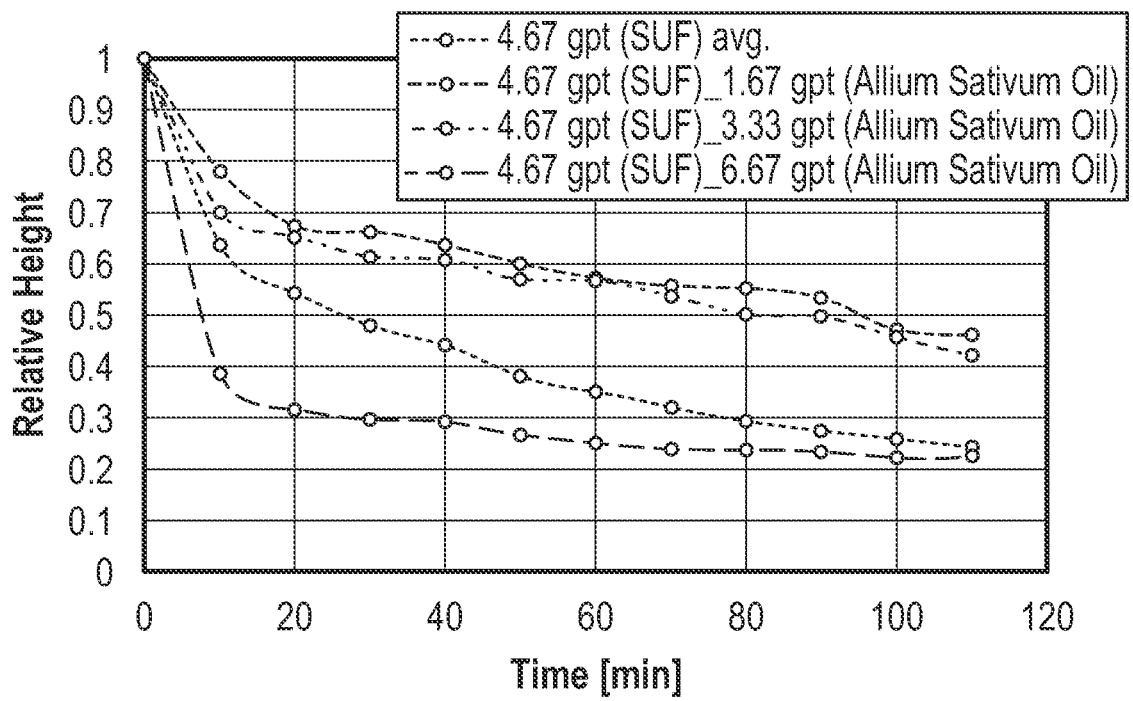
Figure 2:
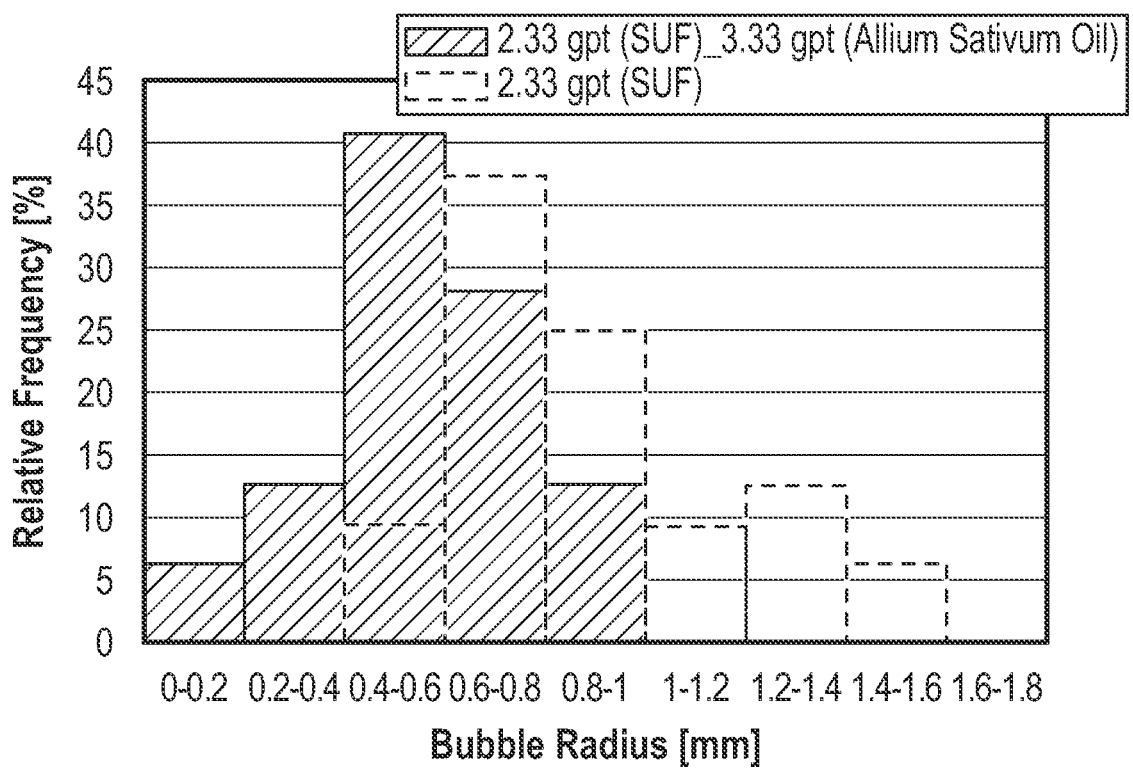
FIG. 2 is a graph comparing the foam bubble size of Sample 3 (2.33 gpt SUF and 3.33 gpt ASO) and Sample 1 (2.33 gpt SUF) after 20 min.
Figure 3:
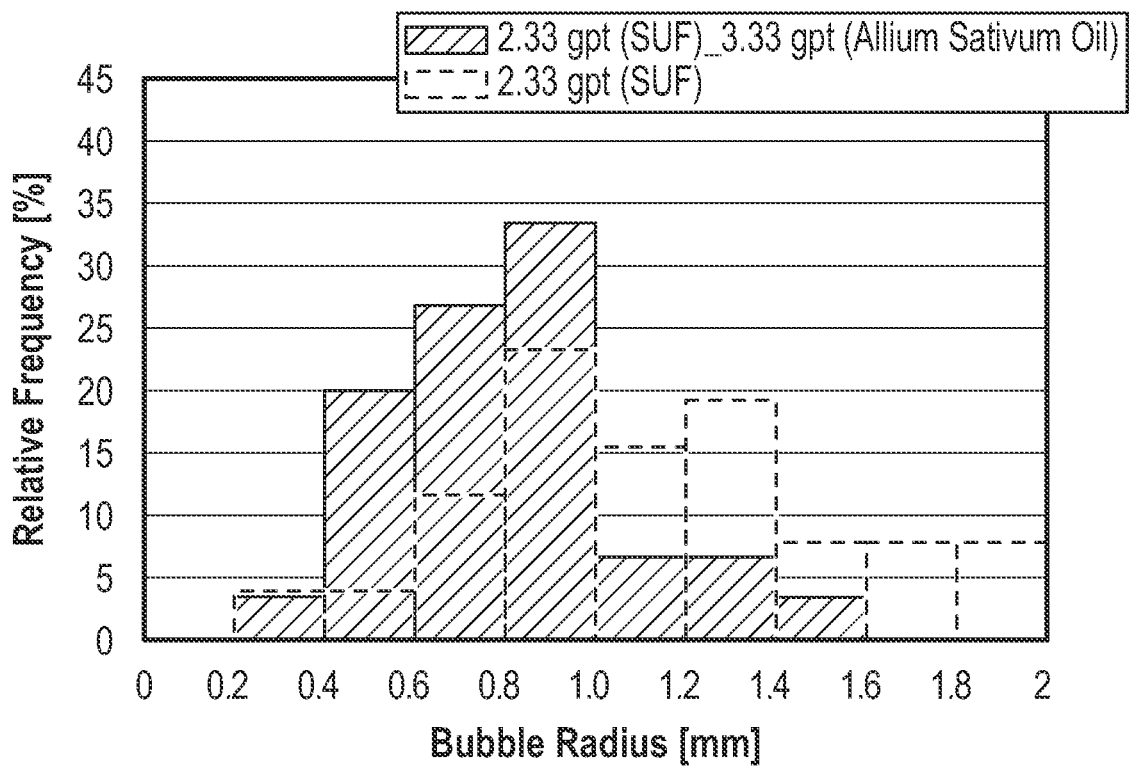
FIG. 3 is a graph comparing the foam bubble size of Sample 3 (2.33 gpt SUF and 3.33 gpt ASO) and Sample 1 (2.33 gpt SUF) after 40 min.
Figure 4:
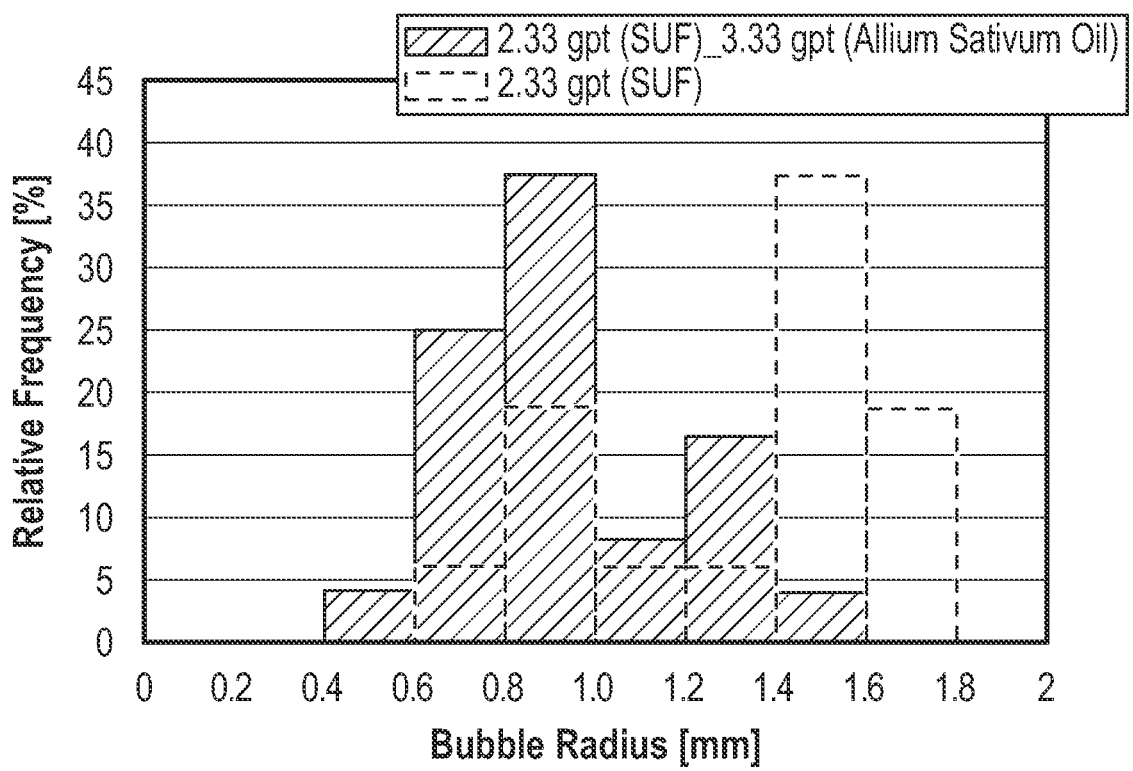
FIG. 4 is a graph comparing the foam bubble size of Sample 3 (2.33 gpt SUF and 3.33 gpt ASO) and Sample 1 (2.33 gpt SUF) after 80 min.
Figure 5:
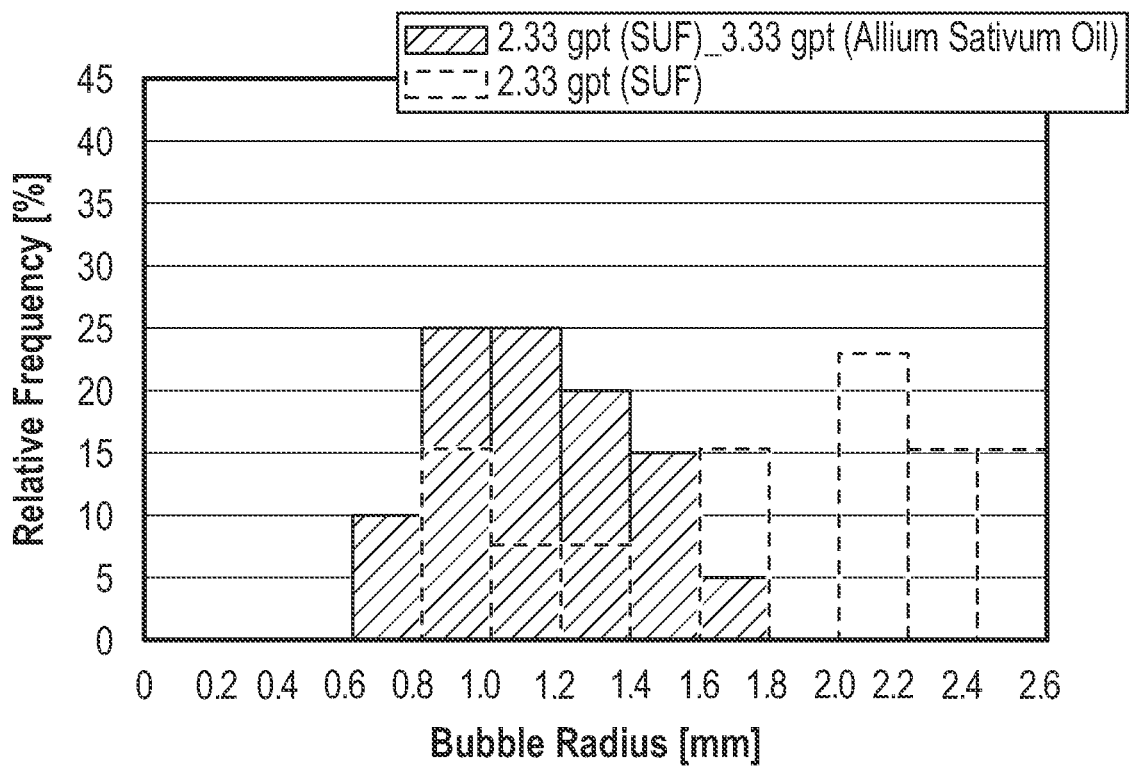
FIG. 5 is a graph comparing the foam bubble size of Sample 3 (2.33 gpt SUF and 3.33 gpt ASO) and Sample 1 (2.33 gpt SUF) after 110 min.

The foams' half-lives are summarized in Table 1 and the results of each set are plotted in FIGS. 1A and 1B, respectively. Results showed that adding *Allium sativum* oil to the surfactant solutions increases the half-life and enhances the stability of generated foams, however, beyond a certain concentration, any additional *Allium sativum* oil can affect the foam stability negatively. The solution containing 2.33 gpt surface-active agent and 3.33 gpt *Allium sativum* oil reached its half-life after 110 min, which is almost triple the time it took the solution containing surface-active agent alone to reach its half-life. Additionally, the solution containing 4.67 gpt surface-active agent more than tripled its half-life with the addition of 1.67 gpt *Allium sativum* oil.

TABLE 1

Half-lives of foams generated from different solutions.

| Stim-IOR FD-1 Concentration [gpt] | Sample # | Allium Sativum Oil Concentration [gpt] | Half-Life [min] |
|---|---|---|---|
| 2.33 | Sample 1 | 0 | 38 |
| | Sample 2 | 1.67 | 70 |
| | Sample 3 | 3.33 | 110 |
| | Sample 4 | 6.67 | 20 |
| 4.67 | Sample 5 | 0 | 28 |
| | Sample 6 | 1.67 | 95 |
| | Sample 7 | 3.33 | 80 |
| | Sample 8 | 6.67 | 10 |

The effect of *Allium sativum* oil can also be seen in the foams' bubble size. FIGS. 2-5 show the different bubbles sizes in the solution containing STIM-IOR (2.33 gpt) and *Allium sativum* oil (3.33 gpt) (Sample 3) measured at different times, 20 min, 40 min, 80 mins, 110 min. The composition comprising *Allium sativum* oil maintained smaller bubble sizes over a longer period, indicating a more stable foam. The foam generated and formed from the composition of the present disclosure has improved stability.

Figure 6A:
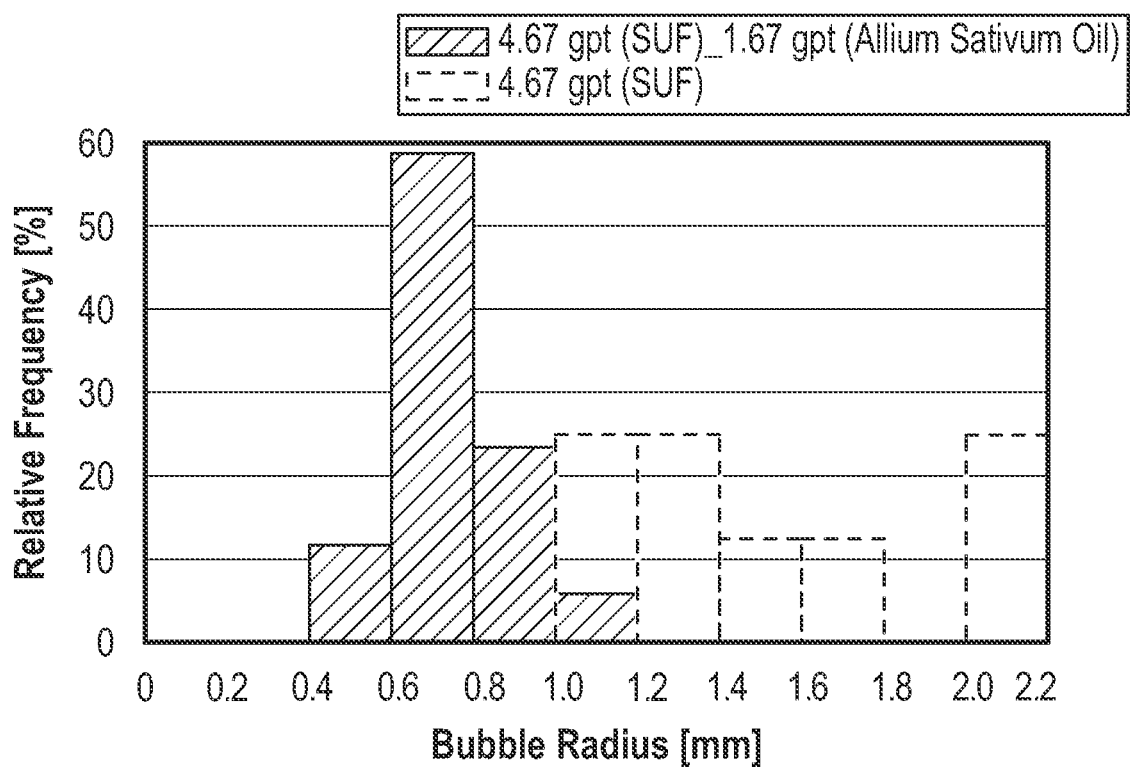
FIGS. 6A-6B are graphs that show bubble sizes of foamed solutions containing Stim-IOR with a concentration of 4.67 gpt and *Allium sativum* oil present in a concentration of 1.67 gpt (Sample 6 and FIG. 6A) and 3.33 gpt (Sample 7 and FIG. 6B).
Figure 6B:
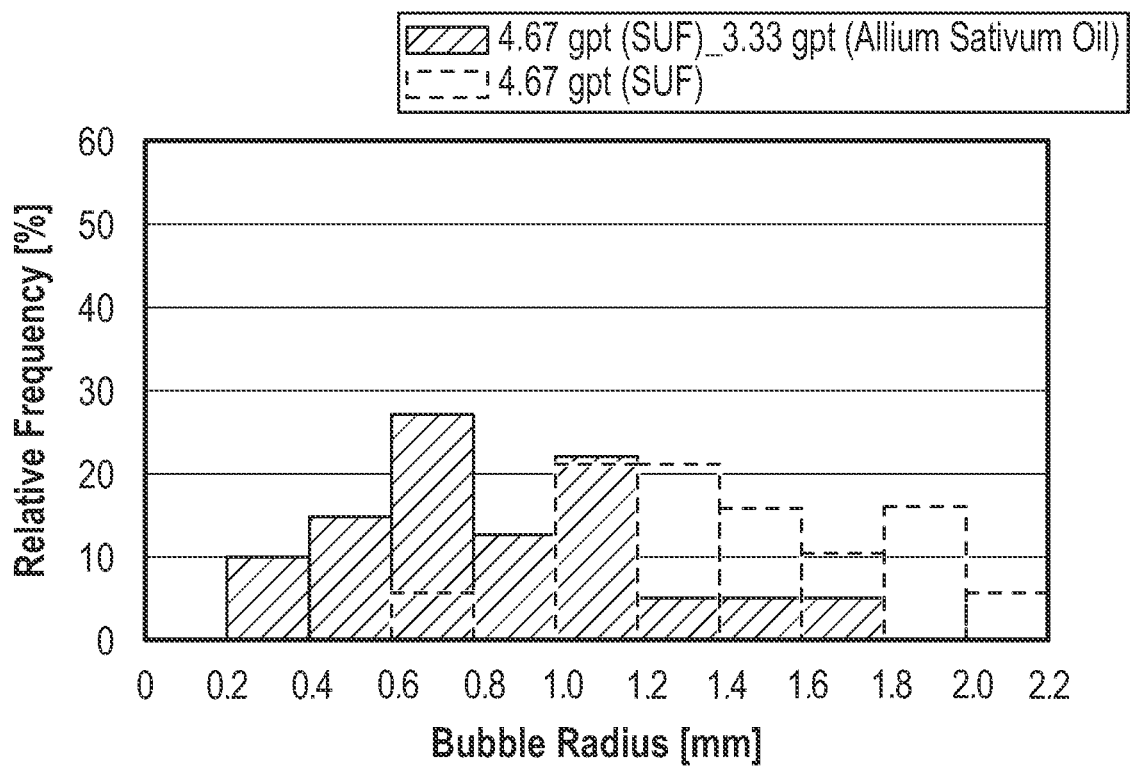

FIGS. 6A and 6B show the bubble sizes in a solution containing Stim-IOR with a concentration of 4.67 gpt and *Allium sativum* oil with a concentration of 1.67 gpt (Sample 6) and 3.33 gpt (Sample 7). Both histograms show that the addition of *Allium sativum* oil enhances the foam stability. However, FIG. 6B shows that the foamed formulation with 3.33 gpt *Allium sativum* oil (Sample 7) has bubble sizes within a range of 0.2 to 1.8 mm, whereas, the solution with 1.67 gpt *Allium sativum* oil (Sample 6) has a range of 0.4 to 1.2 mm, with the majority of bubbles having 0.6-0.8 mm size.

The bubble size provides a good indication of the stability of foam. The stability increases with the addition of *Allium sativum* oil to the surfactant solution, however, beyond a certain concentration, any additional *Allium sativum* oil decreases the stability. As demonstrated above, the experiments show that significant improvements can be achieved by the addition of small amounts of *Allium sativum*, which may decrease the amount of surfactant needed, ultimately decreasing the cost of the foaming composition.

Comparative sample formulations 9-19 were prepared in amounts as provided in Table 2. The comparative oil samples were prepared with about 3.5 gpt surfactant and about 5 gpt of the respective oil. Each of Comparative sample formulations 9-19 were then tested as described above in regard to Samples 1-8. Table 3 includes additional comparison of the Comparative sample formulations prepared with either a base sample with no oil (Comparative sample 9), or with other vegetable and non-vegetable oils (Comparative samples 10-19) prepared in a similar manner to samples 1-8. The half-life, foam height, and rate of decline of each sample including a surfactant and oil was measured and compared relative to the base sample to determine its potential foaming characteristic.

TABLE 2

| Comparative Sample # | Natural Oil | Oil (μL) | SUF (STIM) microliters (μL) | Deionized water (μL) |
|---|---|---|---|---|
| 9 | None | 0 | 14 | 4000 |
| 10 | Castor | 20 | 14 | 4000 |
| 11 | Watercress | 20 | 14 | 4000 |
| 12 | Glycerin | 20 | 14 | 4000 |
| 13 | Wheat Protein | 20 | 14 | 4000 |
| 14 | Cactus | 20 | 14 | 4000 |
| 15 | Rose | 20 | 14 | 4000 |
| 16 | Mustard | 20 | 14 | 4000 |
| 17 | Sweet Almond | 20 | 14 | 4000 |
| 18 | Bitter Almond | 20 | 14 | 4000 |
| 19 | Sesame | 20 | 14 | 4000 |

Table 3 further demonstrates the performance of other vegetable and non-vegetable based oils that have been tested for comparison. Various comparative oils are used in Comparative samples 10-19 (crude oil, sesame oil, sunflower seed oil) and the results in Table 3 demonstrate that the comparative oils did not help or improve the foam stability. While foams prepared with other vegetable and plant oils were demonstrated to perform worse in all measured categories, the present foaming compositions comprising a surfactant and *Allium sativum* oil resulted in unexpectedly improved foam stability as shown in the comparison of the foam half-life's. Specifically, the recorded foam half-life for each of Comparative samples 9-19 were less than the measured half-life of samples 1-7. Accordingly, the results provided in Table 3 further demonstrate that *Allium sativum* is particularly unique in its ability to stabilize foams, especially foams generated with compositions including anionic surfactants, such as an alpha olefin sulfonate surfactant.

TABLE 3

| Comparative Sample # | Natural Oil | Half-Life (min) | Comparative-Half-Life | Foam Height | Rate of Decline |
|---|---|---|---|---|---|
| 9 | None | 12 | | Base | Base |
| 10 | Castor | 9 | Lower than base | Lower than base | Slower than base |
| 11 | Watercress | 8.5 | Lower than base | Same as base | Faster than base |
| 12 | Glycerin | 8 | Lower than base | Same as base | Same as base |
| 13 | Wheat Protein | 10 | Slightly lower than base | Lower than base | Slightly slower than base |
| 14 | Cactus | 10 | Slightly lower than base | Lower than base | Slower than base |
| 15 | Rose | 6.5 | Greatly lower than base | Greatly lower than base | Greatly faster than base |
| 16 | Mustard | 14 | Slightly greater than base | Slightly lower than base | Slightly slower than base |
| 17 | Sweet Almond | 8 | Lower than base | Lower than base | Noticeably slower than base |
| 18 | Bitter Almond | 8 | Lower than base | Lower than base | Greatly slower than base |
| 19 | Sesame | 10 | Lower than base | Lower than base | Greatly slower than base |

The presently disclosed systems, apparatuses, methods, processes and compositions may suitably comprise, consist, or consist essentially of, the elements disclosed and may be practiced in the absence of an element not disclosed. For example, it can be recognized by those skilled in the art that certain steps can be combined into a single step.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Although the preceding description has been made herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method of enhancing recovery of oil from an oil containing formation comprising steps of:
   preparing a foam within the oil containing formation, wherein the preparing the foam comprises:
      mixing a stability enhancing additive and an anionic surfactant to form a foaming composition, wherein the stability enhancing additive is *allium sativum* oil; and
      injecting the foaming composition into the oil containing formation, wherein the foaming composition comprises *allium sativum* oil in an amount ranging from 41.8 to 58.8 vol % with respect to a total volume of the anionic surfactant and the *allium sativum* oil, wherein the foaming composition comprises from 0.1 to 0.4 vol % anionic surfactant.

2. The method of enhancing recovery of oil of claim 1, wherein the foaming composition further comprises water.

3. The method of enhancing recovery of oil of claim 2, wherein the foaming composition comprises from 0.1 to 0.4 vol % *allium sativum* oil.

4. The method of enhancing recovery of oil of claim 2, wherein the foaming composition comprises a combined amount of *allium sativum* and the anionic surfactant in an amount in the range from 0.1 to 1.0 vol %.

5. The method of enhancing recovery of oil of claim 2, further comprising injecting a gas into the oil containing formation after the injecting the foaming composition step, wherein the gas is selected from the group consisting of $CO_2$, $N_2$, methane, mixtures of methane with any of ethane, propane, or butane, flue gas, and mixtures thereof.

6. The method of enhancing recovery of oil of claim 5, wherein the gas is $N_2$ gas.

7. The method of enhancing recovery of oil of claim 2, wherein the foaming composition is prepared in deionized water.

8. The method of enhancing recovery of oil of claim 1, wherein the anionic surfactant is one or more selected from the group consisting of alpha-olefin sulfonates, alkyldiphenyloxide sulfonates, and petroleum sulfonates.

9. A method of enhancing recovery of oil from an oil containing formation comprising steps of:
   pre-forming a foaming composition, wherein the pre-forming comprises:
      mixing a surfactant solution with a stability enhancing additive, wherein the surfactant solution comprises an anionic surfactant in an amount from 0.1 to 0.4 vol %, wherein the stability enhancing additive is *allium sativum* oil, wherein the pre-formed foaming composition comprises *allium sativum* oil in an amount ranging from 41.8 to 58.8 vol % with respect to a total volume of the anionic surfactant and the *allium sativum* oil;

generating a foam, wherein the generating the foam comprises injecting a gas into the foaming composition; and injecting the foam into the oil containing formation.

10. The method of enhancing recovery of oil of claim 9, wherein the foaming composition further comprises water.

11. The method of enhancing recovery of oil of claim 10, wherein the foaming composition comprises from 0.1 to 0.4 vol % *allium sativum* oil.

12. The method of enhancing recovery of oil of claim 10, wherein the foaming composition comprises a combined amount of *allium sativum* and the anionic surfactant in an amount in the range from 0.1 to 1.0 vol %.

13. The method of enhancing recovery of oil of claim 10, wherein the gas is selected from the group consisting of $CO_2$, $N_2$, methane, mixtures of methane with any of ethane, propane, or butane, flue gas, and mixtures thereof.

14. The method of enhancing recovery of oil of claim 13, wherein the foam is generated with $N_2$ gas.

15. The method of enhancing recovery of oil of claim 10, wherein the injecting the gas into the foaming composition is performed at the surface prior to the injecting of the foam composition into a wellbore.

16. The method of enhancing recovery of oil of claim 10, wherein the injecting the gas into the foaming composition is performed in an injection line prior to injecting the foaming composition into the oil containing formation.

17. The method of enhancing recovery of oil of claim 10, wherein the foaming composition comprises deionized water.

18. The method of enhancing recovery of oil of claim 9, wherein the anionic surfactant is one or more selected from the group consisting of alpha-olefin sulfonates, alkyldiphenyloxide sulfonates, and petroleum sulfonates.

* * * * *